UNITED STATES PATENT OFFICE.

ALFRED C. HAFELY, OF NEW YORK, N. Y.

EMBOSSED METALLIC PLATE.

SPECIFICATION forming part of Reissued Letters Patent No. 11,003, dated May 21, 1889.

Original No. 378,442, dated February 28, 1888. Application for reissue filed April 11, 1889. Serial No. 306,919.

*To all whom it may concern:*

Be it known that I, ALFRED C. HAFELY, of the city and State of New York, have invented an Improvement in Embossed Metallic Plates, of which the following is a specification.

The object of this invention is to produce a highly-ornamental embossed metallic sheet the surface of which contains contrasting colors, thereby producing upon the embossed metallic sheet an appearance similar to a picture. To effect these objects I make use of the process or method herein described and to which my invention relates.

I employ a thin sheet of copper or copper-foil attached to a backing of paper or card-board. The surface of this copper is more or less oxidized to render such surface of a dark bronze color. I find that a solution of sulphuret of potash is well adapted to this purpose; but I do not limit myself to the chemical substances made use of for coloring the surface of the copper a dark hue.

The surface of the copper is washed or cleansed to thoroughly remove any remaining chemical substances, and the sheet or foil is embossed in any suitable dies to produce the raised figures, patterns, or designs, after which the higher portions of the patterns or designs are rubbed over with a cloth or other flexible material and a suitable polishing substance, such as fine emery, rouge, or other polishing-powder capable of removing or partially removing the oxidation or coloring from the surface of the copper and revealing the contrasting colors in the oxide and of the copper itself. This operation brings into contrast the red color of the copper and the dark colors of the oxidized surface, and as the red color of the copper is presented on the higher portions of the figures in relief a peculiar artistic effect is produced which renders the embossing more prominent in consequence of the well-known effect of a red substance in contrast with a darker background, and this process is very easily applied to the covers of albums and books and to other embossed plates. Varnish or lacquer may be applied to the metallic surface to prevent atmospheric action. This process is to be distinguished from those heretofore made use of, in which leaf foil or bronze is caused to adhere to the metallic surface and is partially rubbed off after embossing.

I claim as my invention—

1. The method herein specified of ornamenting thin metallic plates, consisting in oxidizing or discoloring the surface of the metal to render the same dark, pressing the metallic plate between dies to produce ornamental figures or designs in relief, and polishing the higher portions of the embossed figures or designs to reveal the color that contrasts with the oxidized surface, substantially as set forth.

2. The method herein specified of producing ornamental embossed copper plates, consisting in oxidizing uniformly the surface of the copper by sulphuret of potash or similar chemical substance to render the same dark and embossing the foil or sheet of copper, substantially as set forth.

3. The embossed copper plate having a dark oxidized surface and the dark color removed on the high portions to reveal the contrasting colors, substantially as set forth.

4. The method herein specified of producing thin ornamental metallic plates, consisting in oxidizing or discoloring the surface of the metal to render the same dark, attaching to the thin metal a backing of fibrous material, pressing the thin metal between dies to produce ornamental figures or designs, and polishing the higher portions of the embossed figures or designs to reveal the color that contrasts with the oxidized surface, substantially as specified.

Signed by me this 5th day of April, 1889.

ALFRED C. HAFELY.

Witnesses:-
GEO. T. PINCKNEY,
WILLIAM G. MOTT.